United States Patent [19]
Holtzclaw

[11] 4,235,486
[45] Nov. 25, 1980

[54] REPLACEABLE BEARING ASSEMBLY FOR A PUMP APPARATUS

[76] Inventor: Carl B. Holtzclaw, 6412 W. County Rd., Odessa, Tex. 79762

[21] Appl. No.: 957,711

[22] Filed: Nov. 6, 1978

[51] Int. Cl.³ ............................................. F16C 33/00
[52] U.S. Cl. .................................. 308/189 R; 308/193; 308/213
[58] Field of Search ...................... 415/170 R, 170 A; 308/189 R, 193, 194–198, 212–214, 187.2

[56] References Cited
U.S. PATENT DOCUMENTS

| 3,295,898 | 1/1967 | Finzel | 308/189 R |
| 3,841,791 | 10/1974 | Doolin | 415/170 A |

FOREIGN PATENT DOCUMENTS

| 890901 | 10/1953 | Fed. Rep. of Germany | 415/170 A |
| 825153 | 11/1937 | France | 415/170 A |

Primary Examiner—Harry N. Haroian
Attorney, Agent, or Firm—Marcus L. Bates

[57] ABSTRACT

Apparatus for field repairing centrifugal pumps. A pump body is attached to the main pump housing and extends therefrom with the shaft being received in axial alignment therewith. A liner is received in close tolerance relationship within a marginal outboard end of the body and is removably secured thereto in a novel manner. Spaced-apart cam lock bearings are removably affixed to the shaft and friction fitted to the interior of the liner so that the body, along with the liner and bearings; or, alternatively, only the liner; can be removed from attached relationship respective to the pump assembly.

9 Claims, 4 Drawing Figures

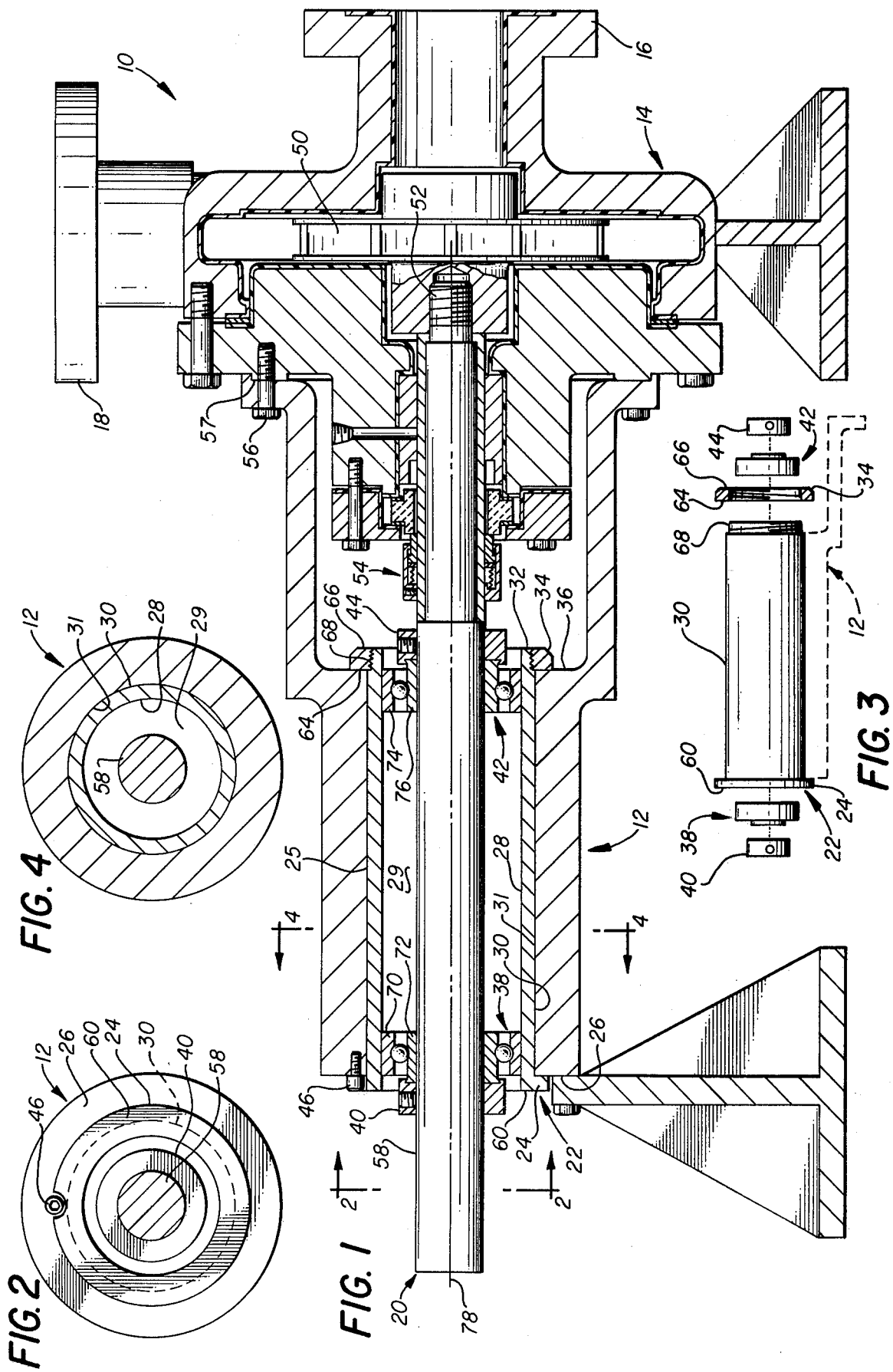

REPLACEABLE BEARING ASSEMBLY FOR A PUMP APPARATUS

BACKGROUND OF THE INVENTION

Centrifugal pumps must often be located in remote geographical areas. When one of the pumps fails, the expense of transporting the pump to a repair facility usually represents a greater cost than the cost of the repair. Moreover, the repair of a pump necessitates shutting down various plant equipment, which sometimes represents a great expense.

Pump failure often occurs because of malfunction of the journal means located between the pump seal and the prime mover. When the pump fails, it is customary to transport the faulty pump to a suitable repair facility and to carry out the necessary machine work to replace the bearings as may be required.

It would be desirable to be able to repair the outboard journal means of a pump assembly without the necessity of transporting the pump to a repair facility. It would especially be desirable if the journal could be replaced without the use of engine lathes and other specialized machine shop equipment. This is a subject of the present invention.

SUMMARY OF THE INVENTION

This invention relates to pumps, and especially to apparatus by which the outboard journal means of a pump assembly can be field repaired in a minimum of time and with the use of simple tools. The apparatus comprises a pump body connected to and extending from a pump housing at a location outboard of the shaft seal. An impeller is positioned within the housing and a shaft extends from the impeller in the usual manner. The pump body is axially aligned with a marginal length of the shaft, thereby leaving an annulus between the inside diameter of the body and the outside diameter of the shaft.

A liner is concentrically arranged respective to the shaft and the body and is coextensive with a marginal length thereof. A shoulder is formed at each end portion of the body which abuttingly receives a shoulder formed on each opposed end of the liner. One shoulder of the liner is a circumferentially extending, outwardly directed flange, while the other shoulder of the liner is formed by a removable nut. The nut threadedly engages an outer, marginal end portion of the liner. Spaced-apart bearing means are interposed between the outside diameter of the shaft and the inside diameter of the liner and maintains the shaft in true alignment.

The body receives the liner in close tolerance relationship therewithin, and the interior of the liner is formed so that when the body, liner, and spaced-apart bearings are received about the shaft in attached relationship to the housing, the pump shaft is aligned respective to the pump housing and impeller in a superior manner.

Accordingly, a primary object of the present invention is the provision of means by which pump assemblies can be field repaired without the use of specialized machine shop equipment.

Another object of the invention is the provision of a combination of a centrifugal pump and a replaceable bearing assembly therefor.

A further object of this invention is to disclose and provide the combination of a centrifugal pump and a bearing assembly therefor which enables the pump bearings to be replaced in the field.

A still further object of this invention is to provide improvements in a pump assembly which enables the outboard main support bearings to be replaced with a minimum of expense.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 1 is a longitudinal, cross-sectional view of a pump apparatus made in accordance with the present invention;

FIG. 2 is a cross-sectional view taken along line 2—2 of FIG. 1;

FIG. 3 is a cross-sectional view taken along line 3—3 of FIG. 1; and,

FIG. 4 is a detailed view of part of the apparatus disclosed in the foregoing figures.

DETAILED DESCRIPTION OF THE PREFERRED EMBODIMENT

In the figures of the drawings, there is disclosed a pump apparatus 10, which preferably is a centrifugal pump and which includes improvements associated therewith made in accordance with the present invention. A pump body 12 of the present invention is disclosed in combination with a pump housing 14 of the prior art. The pump housing includes inlet 16 and outlet 18, which can take on any number of different forms.

Shaft 20 extends into the housing and through the body so that a prime mover can be connected at the free terminal end thereof. Liner 22 of the present invention is cylindrical in form and includes a fixed flange 24 located at the outboard end of the pump. The flange circumferentially extends about and radiates from the central body portion 25 of the liner. The flange is illustrated as abuttingly engaging a shoulder 26 which forms the outboard terminal end of the pump body.

Numeral 28 indicates the inside diameter of the liner, numeral 29 is an annular area formed between the shaft and the body, while numeral 30 indicates the outside diameter of the liner. The pump body is line bored to provide a cylindrical inside surface area 31, with the surface areas 30 and 31 being made for a close tolerance fit therebetween, thereby causing the liner to be perfectly aligned in concentric relationship respective to the longitudinal axis 78 of the shaft.

The inboard end of the liner is provided with a removable flange in the form of a nut 34. The inside or outboard face of the nut abuttingly engages a shoulder 36 formed on the illustrated, diverging, inboard side of the pump body.

Outboard bearing 38 is fastened to the shaft at 40 and is press fitted into the liner. The inboard bearing 42 includes fastener 44 by which the bearing is attached to another marginal length of the shaft. The bearing is press fitted into a marginal, inboard end of the liner.

The outer race 70 of the bearing 38 is affixed to the liner and thereby held against rotation, while the inner race 72 is attached to and rotates with the shaft. The outer race 74 and inner race 76 of bearing 42 is similarly attached to the liner and to the shaft.

The bearings 38 and 42 preferably are of a type known as "cam-lock" (TM) bearings, as for example, a Fafnir RA-103 NPP heavy-duty bearing.

The liner can be cast of suitable metal and subsequently machined, or alternatively, turned from commercially available steel stock. The nut 34 threadedly engages the inboard, marginal end of the liner with the outside diameter of the threads being smaller than the inside diameter of the linebore formed within the body. The nut preferably is a commercially available bearing nut, such as AN-30, for example.

The apparatus of the present invention is used in combination with a pump to enable rapid field repair thereof. The repair is carried out by loosening fastener means 40, 44, and 56; thereby enabling the entire pump body, along with the liner and bearings, to be removed from the pump housing. A new assembly can be replaced onto the pump housing by reversing the above procedure.

After the body has been removed from the housing, the bearings can be pressed from the liner and replaced as may be required. Alternatively, the liner and bearings can be removed from the body without the necessity of removing the body from the housing. This is accomplished by loosening fasteners 40 and 44 along with the nut 34. The liner is withdrawn from the body, leaving the nut 34 supported by a marginal length of the shaft in proximity of the seal 54. The bearings are removed along with the liner. The various components can be serviced in the field as may be required. The apparatus is replaced by reversing the above procedure.

The apparatus of the present invention improves the alignment between the shaft and the pump housing and positions the impeller so that it runs true within its cavity. The liner can be moved inboard or outboard along the longitudinal centerline 78 by placing shims under either of the opposed flanges, thereby precisely positioning the impeller within its cavity in a longitudinal direction. Repositioning of the bearings attains the same alignment.

The present invention is simple in design and enables field repair of centrifugal pumps to be carried out in a manner which has heretofore been unknown. The apparatus of the present invention provides a new combination which provides the unexpected result of an "off-the-shelf" repair item which is adaptable to any number of different pumps. The manner in which the bearings are associated with the liner and with the pump body enables the liner to be produced in large numbers and maintained available as a stock item. The physical dimensions of the liner, bearings, and pump body can be selected to accommodate a number of different types and sizes of pumps.

I claim:

1. A pump apparatus having a housing within which a pump impeller is rotatably mounted, a shaft sealingly extending from said housing and connected to rotate said impeller; the combination with said pump apparatus of a replaceable bearing assembly;

said replaceable bearing assembly includes a pump body connected to and extending from said housing with said shaft being received within said pump body; said pump body having a shoulder formed at an outboard and an inboard location, a liner for said pump body, said liner is in the form of a hollow cylinder having an outwardly directed flange at an outboard end and a marginal threaded outer surface at the inboard end, a nut which threadedly engages said threads;

means forming a counterbore through said pump body in axial alignment with said shaft for receiving said liner in close tolerance relationship therewithin; means forming a counterbore through said liner to provide the inside diameter of the liner with an annulus between said shaft and said liner;

spaced bearing means located within said annulus and attached for providing low frictional support between said shaft and liner;

said flange of said liner abuttingly engages the outboard shoulder of the pump body, the threaded end of the liner extends inboard of said inboard shoulder, so that said nut can engage said threads to secure the liner within the body with the nut and flange of the liner placing the liner in tension due to the compression of the nut and flange against the body.

2. The combination of claim 1 wherein said bearings are ball bearings which are removably secured to the shaft by a fastener means, and secured to the inside wall surface of the liner by a close tolerance fit.

3. The combination of claim 2 and further including means for preventing rotation of the liner, including a fastener means received through a marginal edge portion of the flange in attached relationship to the outboard shoulder of the body.

4. The combination of claim 3 wherein said body is detachable from the pump housing so that the body, liner, and bearings can be removed as a unit from the remainder of the pump apparatus.

5. The combination of claim 4 wherein said liner and said bearings can be removed from said body by removing said nut and sliding the liner in an outboard direction away from said body.

6. The combination of claim 1 wherein said bearings are ball bearings removably secured to the shaft by a fastener means and secured to the inside peripheral wall surface of the liner by a close tolerance fit therebetween;

said means preventing rotation of the liner is a fastener means received through an aperture formed in the flange and threadedly attached to the outboard shoulder of the body.

7. The combination of claim 6 including means by which said body is detachable from the pump housing so that the body, liner, and bearings can be removed as a unit from the pump housing and shaft; and thereafter, said liner and said bearings can be removed from said body by removing said nut and sliding the liner in an outboard direction away from said body.

8. A centrifugal pump assembly having a housing within which there is disposed an impeller, a shaft attached to and extending from said impeller and away from said housing, a body member attached to said housing and extending away therefrom, an axial bore formed through said body member with said shaft being received therethrough in spaced relationship to the axial bore to thereby leave an annulus therebetween;

said body member having an outboard shoulder and an inboard shoulder arranged normal to the shaft;

a liner received within said axial bore, said liner includes an outwardly directed flange at one end thereof which abuttingly engages said outboard shoulder, means providing said liner with an outside diameter which is telescopingly received within said axial bore in close tolerance relationship therewith, and a fastener means at the inboard marginal end of said liner for securing said other end to said inborad shoulder;

bearing means at opposed marginal ends of the liner by which the shaft is supported in aligned relationship respective to the impeller and to the axial centerline of the body;

said bearings are ball bearings which are removably secured to the shaft by a fastener means, and secured to the inside wall surface of the liner by a close tolerance fit;

means for preventing rotation of the liner, including a fastener means received through a marginal edge portion of the flange in attached relationship to the outboard shoulder of the body;

said body is detachable from the pump housing so that the body, liner, and bearings can be removed as a unit from the remainder of the pump apparatus.

9. The pump assembly of claim 8 wherein said liner and said bearings can be removed from said body by removing said nut and sliding the liner in an outboard direction away from said body.

* * * * *